United States Patent
Olivieri

(10) Patent No.: US 9,176,321 B2
(45) Date of Patent: Nov. 3, 2015

(54) CONTINUOUS SCANNING MODULE, SCANNING SYSTEM COMPRISING SAID MODULE AND RELATED SCANNING METHOD

(71) Applicant: SELEX ES S.P.A., Rome (IT)

(72) Inventor: Monica Olivieri, Carmignano (IT)

(73) Assignee: SELEX ES S.P.A., Rome (IT)

( * ) Notice: Subject to any disclaimer, the term of this patent is extended or adjusted under 35 U.S.C. 154(b) by 0 days.

(21) Appl. No.: 14/371,589

(22) PCT Filed: Jan. 9, 2013

(86) PCT No.: PCT/IB2013/050166
§ 371 (c)(1),
(2) Date: Jul. 10, 2014

(87) PCT Pub. No.: WO2013/105023
PCT Pub. Date: Jul. 18, 2013

(65) Prior Publication Data
US 2015/0001396 A1  Jan. 1, 2015

(30) Foreign Application Priority Data
Jan. 11, 2012  (IT) .................................. FI12A0001

(51) Int. Cl.
G02B 26/08  (2006.01)
G02B 26/12  (2006.01)
H04N 1/113  (2006.01)
H04N 3/09  (2006.01)

(52) U.S. Cl.
CPC .............. *G02B 26/124* (2013.01); *G02B 26/12* (2013.01); *H04N 1/113* (2013.01); *H04N 3/09* (2013.01)

(58) Field of Classification Search
CPC ....... G02B 26/12; G02B 26/123; G02B 17/00
USPC ........... 359/201.1, 204.1, 205.1, 216.1, 224.1
See application file for complete search history.

(56) References Cited

U.S. PATENT DOCUMENTS

| | | | |
|---|---|---|---|
| 5,663,825 A | 9/1997 | Amon et al. | |
| 6,937,395 B2 | 8/2005 | Hoefft et al. | |
| 2002/0088942 A1 | 7/2002 | Metcalf et al. | |
| 2009/0195848 A1* | 8/2009 | Debenedictis et al. | .... 359/201.1 |
| 2009/0260511 A1 | 10/2009 | Melnychuk et al. | |

FOREIGN PATENT DOCUMENTS

DE  102 26 545 C1  9/2003

* cited by examiner

*Primary Examiner* — Euncha Cherry
(74) *Attorney, Agent, or Firm* — McGlew and Tuttle, P.C.

(57) ABSTRACT

A continuous scanning module is described, comprising: a polygonal scanning drum (9) rotating at substantially constant speed (f9) and provided with a plurality of first reflecting side faces (9.1-9.7) and at least one polygonal forward motion compensation-forward motion compensation drum (15) rotating synchronously with the scanning drum (9). The forward motion compensation drum (15) is provided with second reflecting side faces (15.1-15.7)) each of which receives an image from a corresponding first reflecting face of the scanning drum, and reflects it towards a scanning path.

34 Claims, 8 Drawing Sheets

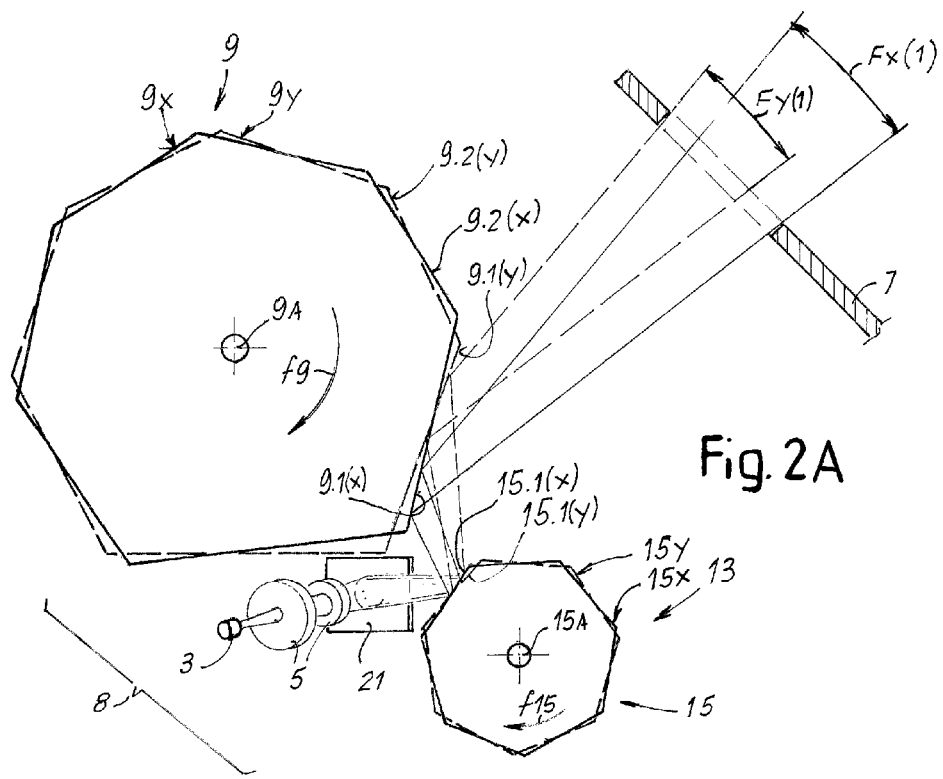
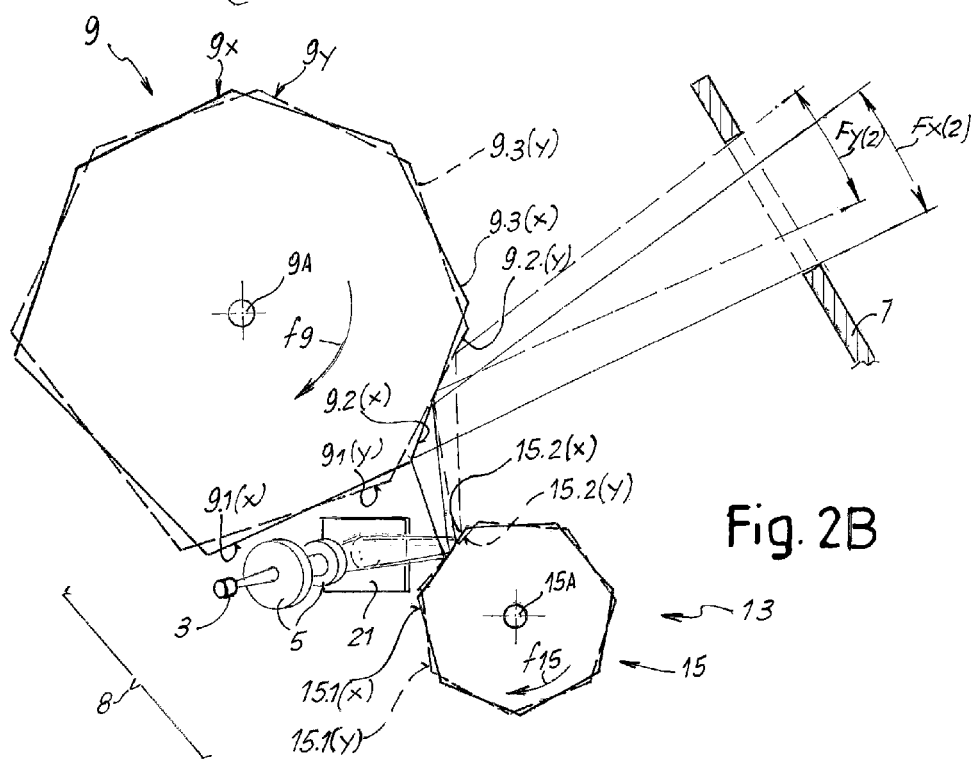

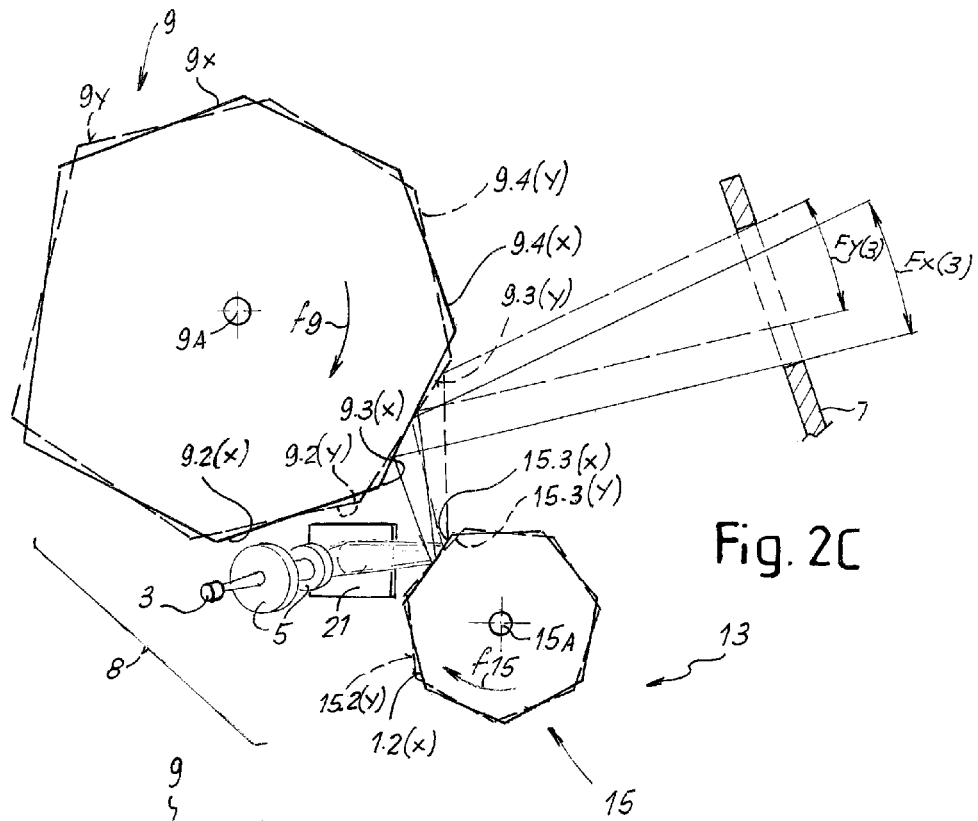
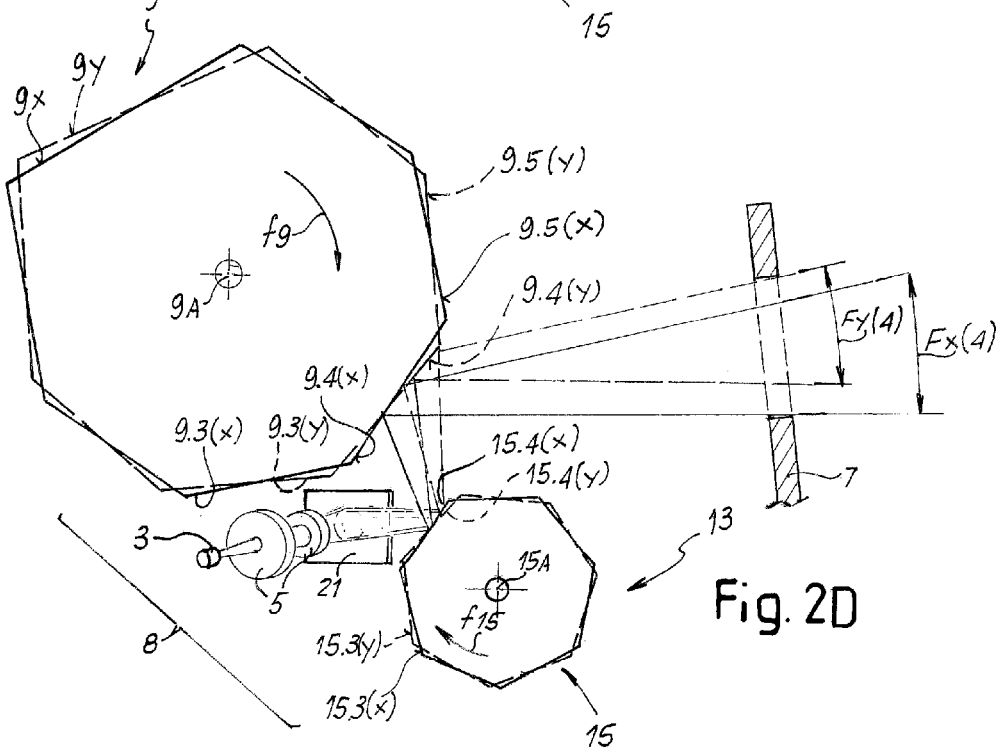

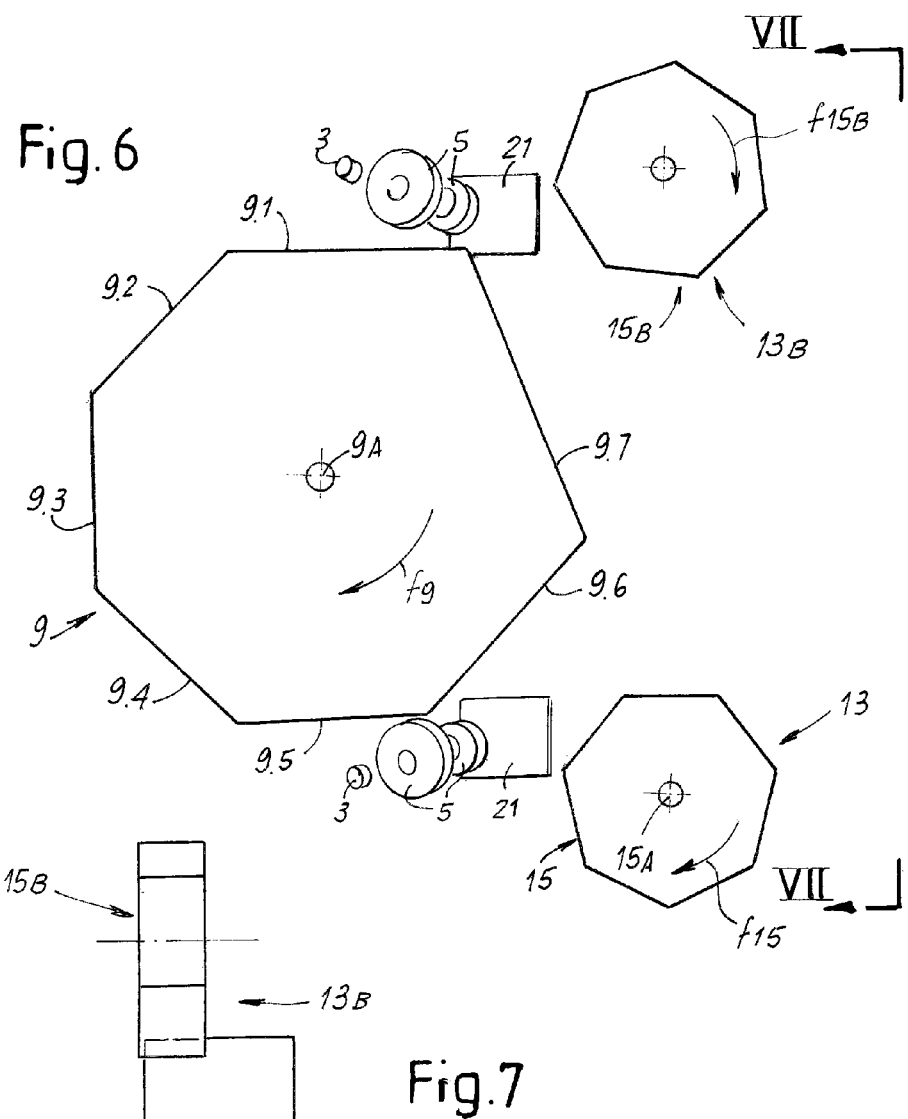
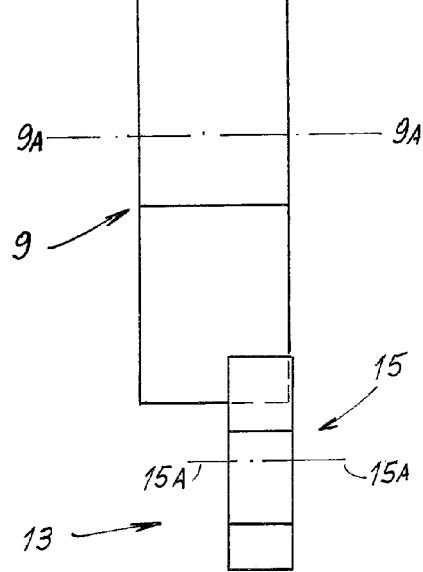

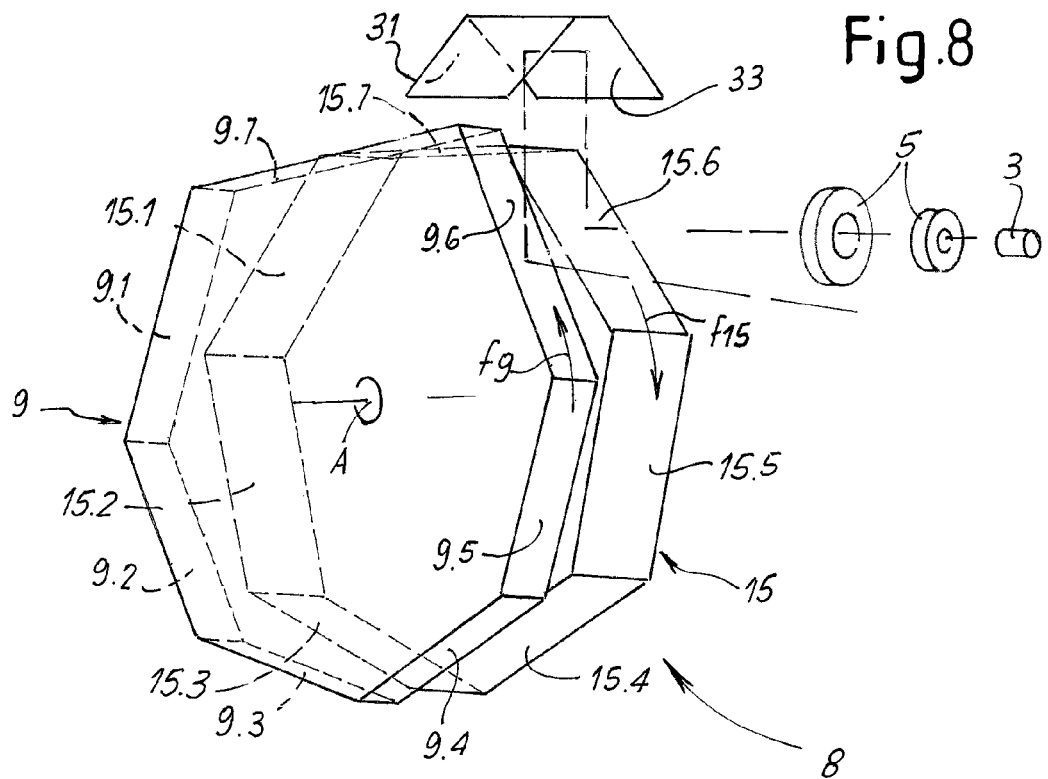
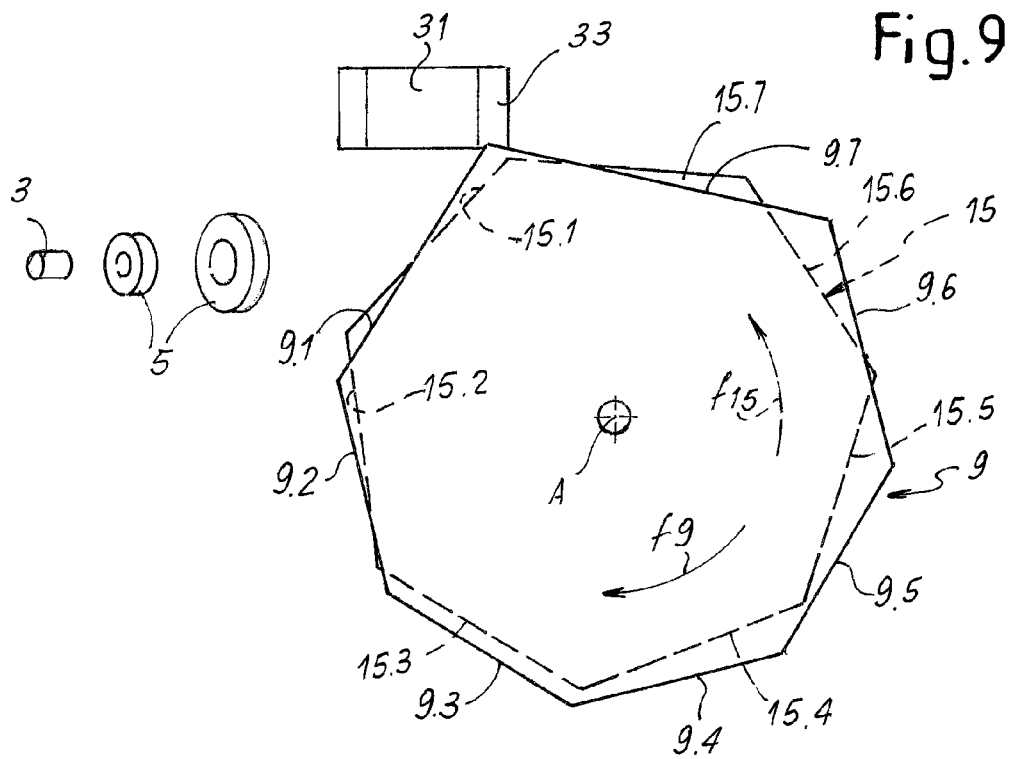

CONTINUOUS SCANNING MODULE, SCANNING SYSTEM COMPRISING SAID MODULE AND RELATED SCANNING METHOD

TECHNICAL FIELD

The present invention relates to scanning modules for acquiring images from a field of view through a detector. The present invention relates in particular to scanning modules comprising a scanning drum with continuous rotational motion.

The invention also relates to an image acquisition system comprising at least one scanning module, focusing lenses and at least one detector.

STATE OF THE ART

To acquire images from particularly wide fields of view, for instance 70° or more, that the lens and the detector are unable to observe, scanning modules are often necessary, which acquire sequential portions of the field of view. These problems arise in particular when infrared staring sensors are used.

In some known devices, scanning is based upon the "step and stare" method. Step and stare scanning modules are provided with a rotating drum with reflecting faces rotating in a stepped manner. The drum stops at each step, so that the sensor can acquire the image. This is due to the fact that the sensor or detector has a finished integration time. At high frame rate, typically equal to or greater than 10 Hz, accelerations on the components of these scanning modules are significantly high, greater than 20,000 rads$^2$. These accelerations cause very high dynamic stresses.

To avoid problems due to the dynamic stresses, scanning modules have been produced wherein the scanning drum rotates at constant angular speed. However, this function mode leads to a problem of image forward motion. In fact, the sensor has a finished integration time, during which the image reflected by the face of the rotating drum moves angularly, and this results in image forward motion.

SUMMARY OF THE INVENTION

According to what described, a scanning module is provided to solve or alleviate the above mentioned problems, wherein a forward motion compensation module is associated with a scanning drum, rotating preferably at constant speed; this module eliminates or reduces the image forward motion due to the movement of the rotating drum during the image acquisition time.

In substance, according to one embodiment, a continuous scanning module is provided with a first rotating drum, also called, in the following, scanning drum, which has a polygonal cross section, rotates at substantially constant speed and comprises a plurality of first reflecting side faces. With the first drum, or scanning drum, at least one forward motion compensation module is associated to compensate the image forward motion caused by the rotation of the scanning drum during the integration time of the sensor associated with the scanning module. The forward motion compensation module advantageously comprises a second drum, or forward motion compensation drum, which has polygonal cross-section and rotates synchronously with the scanning drum. At least some faces of the second drum, or forward motion compensation drum, are reflecting and form second reflecting side faces. Each second reflecting side face of the forward motion compensation drum receives an image from one corresponding first reflecting side face of the scanning drum, and reflects it towards a scanning path. In some embodiments all faces of the two drums are reflecting and the two drums can have the same number of faces. In this case, the scanning drum has a first plurality of first reflecting side faces, the same in number as the second plurality of reflecting faces of the forward motion compensation drum. However, these conditions are not necessary. Additional faces may be for instance provided, even non reflecting, for example to acquire equalization images of a sensor associated with the scanning module. In currently preferred embodiments the two drums have the same number of faces, even if also this condition is not necessary. It is only important that one respective reflecting face of the second drum, or forward motion compensation drum, corresponds to each active face of the scanning drum, i.e. to each face of the scanning drum designed to reflect, towards the optical path of the device, an image of a portion of the scanning field view identifying a scanning direction. In this way the forward motion effect due to the scanning drum is compensated thanks to the synchronous and coordinated motion of the forward motion compensation drum.

The motion of the forward motion compensation drum recovers, i.e. compensates the image forward motion during the integration time caused by the rotation of the scanning drum, counterbalancing the motion of the scanning drum, i.e. maintaining the scanning direction fixed, during the acquisition interval, i.e. during the sensor integration time. Members are arranged along the scanning path to focus and acquire the images of the scene scanned by the scanning module. In the scanning path a focusing lens and a sensor or detector are typically provided.

While rotating, the scanning drum sequentially brings each its reflecting face opposite an image acquisition window. Each face reflects the light beams from the acquisition window towards a corresponding face of the forward motion compensation drum. Each reflecting face of the forward motion compensation drum reflects towards the scanning path the beams received from the scanning drum. In the scanning path one or more bending mirrors may be provided, conveying the beam towards the focusing lens and the sensor.

In advantageous embodiments the forward motion compensation drum rotates at substantially the same angular speed as the scanning drum. In some embodiments the directions of rotation are the same. In other embodiments the directions of rotation are opposite. Below examples of both embodiments will be described in detail. The directions of rotation are the same or opposite depending upon the reciprocal position of the axes of rotation of the two drums, as will be better explained below.

The two drums preferably have the same number of side faces. In practical embodiment the scanning drum has an irregular polygonal cross-section. The forward motion compensation drum may have a regular polygonal cross-section. To acquire a sensor equalization image, in advantageous embodiments a side face of the scanning drum may be used. In other embodiments, a face of the forward motion compensation drum may be used to acquire a sensor equalization image. In case the sensor does not require equalization, this face may be simply used to complete the rotation of the scanning drum during a dead interval, i.e. when the sensor associated with the scanning module is not acquiring an image.

Practically, the reflecting faces of the scanning drum and those of the forward motion compensation drum may have flat surfaces, usually extending parallel to the rotation axis of the respective drum. In some embodiments a face of the scanning drum and, if necessary, the corresponding face of the forward motion compensation drum may be inclined to acquire the image of a thermal reference or other equalization image at each complete revolution of the drums.

The scanning drum and the forward motion compensation drum may be arranged with the axes of rotation spaced from each other, so that the drums are adjacent to each other. In other embodiments, the scanning drum and the forward motion compensation drum may rotate around a common axis. In this case the two drums are superposed onto each other along the axial direction. In this case bending mirrors are provided to bend the image reflected by the reflecting faces of the scanning drum towards the respective reflecting faces of the forward motion compensation drum.

In some embodiments the scanning module may comprise more than one forward motion compensation module and more than one scanning path, to increase the overall field of view.

The present invention also relates to a scanning system comprising: a scanning module according to one or more of the previous claims; at least one lens; and at least one detector; said lens conveying the image acquired by the scanning module towards said detector.

Further advantageous embodiments and features of the scanning module and the system comprising said module are described below, with reference to the embodiments illustrated in the attached drawings, and in the claims, forming an integral part of the description.

The brief description above illustrates some characteristics of the various embodiments of the present invention, for better understanding the detailed description below and better evaluating the contribution of the invention to the state of the art. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The present invention will be better understood by means of the description below and the attached drawing, which shows a non-restrictive embodiment of the invention. More in particular, in the drawing:

FIGS. 2A to 2F show a scanning sequence through the scanning module of FIG. 1;

FIG. 6 shows a view parallel to the axes of rotation of a scanning module in a further embodiment, comprising a double forward motion compensation module in a parallel view;

FIG. 7 is a side view according to VII-VII of FIG. 6;

FIG. 8 is a simplified perspective view of a scanning module in a further embodiment; and FIG. 9 is a view, parallel to the rotation axis of the drums, of the scanning module of FIG. 8.

DETAILED DESCRIPTION OF EMBODIMENTS OF THE INVENTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

Reference will be specifically made below to a scanning module and system for acquiring infrared images; however it should be understood that the concepts upon which the invention is based may be also used in other scanning modules operating at different wavelengths.

Figure 1:
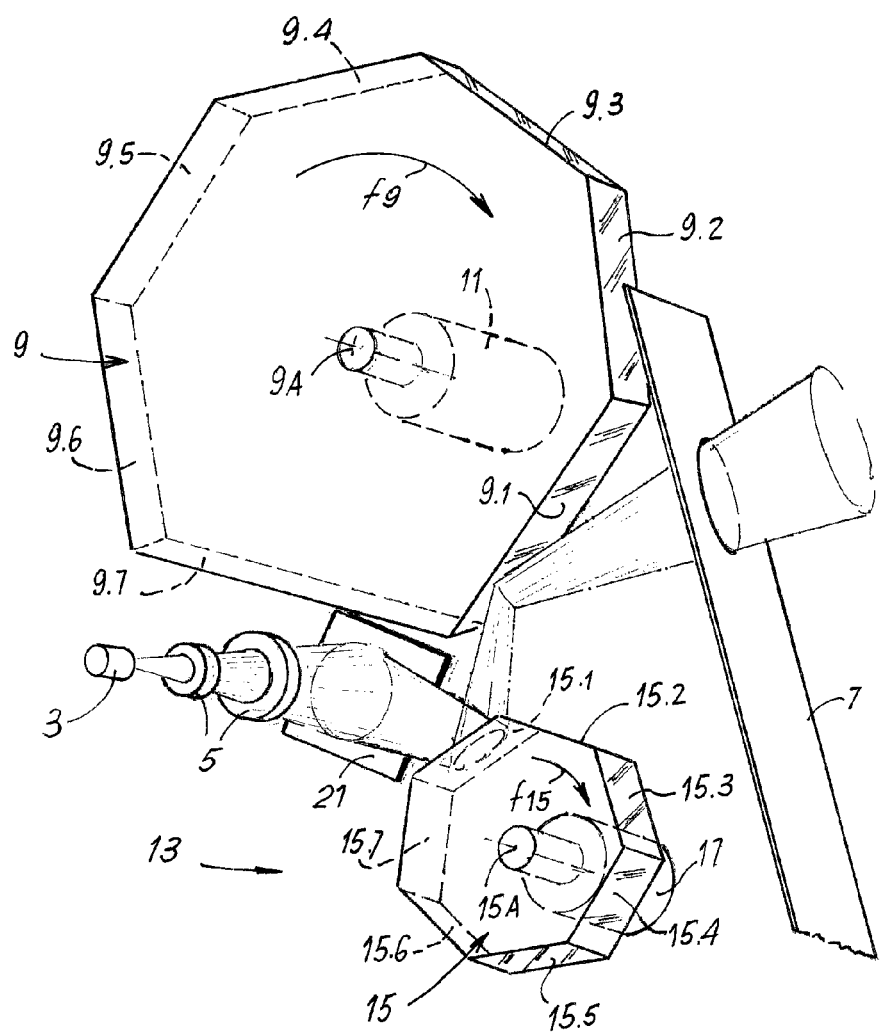
FIG. 1 is a schematic axonometric view of a scanning system comprising a scanning module with a forward motion compensation module, a focusing lens and an acquisition sensor.
Figure 2E:
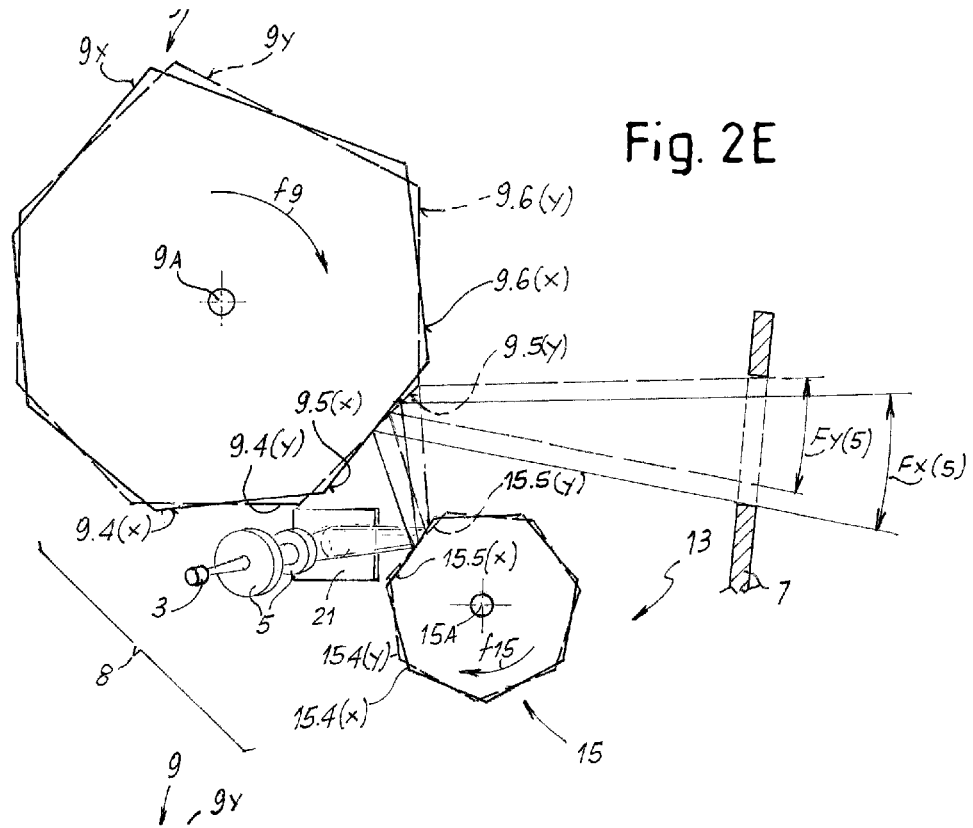
Figure 2F:
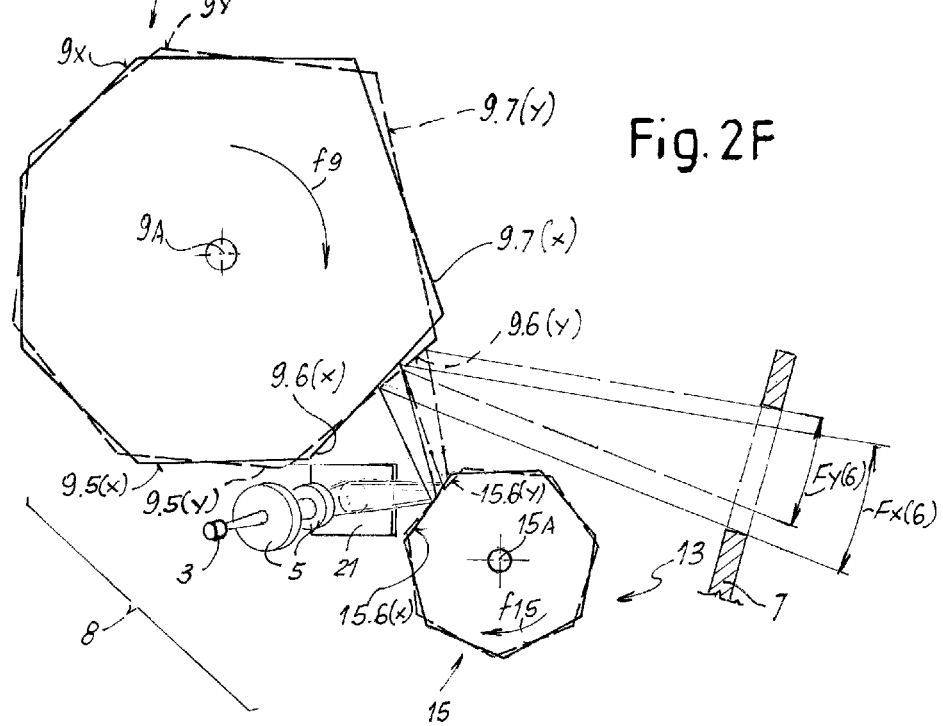

FIG. 1 schematically illustrates the main components of the scanning module with the scanning drum, the forward motion compensation (forward motion compensation module and the focusing lens with the sensor or detector for image acquisition.

More in particular, in FIG. 1 number 1 generically indicates the overall scanning system, and number 3 indicates the detector or sensor thereof, onto which the image, acquired by the scanning module, is focused through a focusing lens 5. Number 7 indicates the window through which the radiation from an outer scene, whose image must be acquired, enters the scanning system 1. The scanning module is indicated as a whole with number 8 and comprises a first rotating drum 9, also called scanning drum, the rotation axis whereof is indicated with 9A. 11 schematically indicates the motor rotating the drum 9 according to the arrow f9.

A forward motion compensation module 13 is provided adjacent the rotating drum 9; it comprises a second rotating drum 15, also called forward motion compensation drum; number 17 indicates the motor rotating this latter. The rotation axis of the drum 15 is indicated with 15A. The motor 17 rotates the forward motion compensation drum 15 according to the arrow f5 in the same direction as the direction 19 of rotation of the scanning drum 9. The angular speed of the two drums 9 and 15 is substantially constant and equal for the two drums.

Through a scanning process, better described below, the image of the outer scene is reflected by reflecting surfaces or mirrors arranged on the first rotating drum, or scanning drum, 9, and on the forward motion compensation drum 15; it is then reflected by a bending mirror 21 towards the focusing lens 5. The bending mirror 21 may be omitted, or more bending mirrors may be provided according to the position where the focusing lens 5 and the sensor 3 are arranged.

In the illustrated embodiment, the rotating drum or scanning drum 9 has a substantially prismatic irregular polygonal shape. In some embodiments, the shape of the rotating drum 9 may be slightly different, with a face not parallel to the axis 9A of the rotating drum 9, for the purposes explained below.

9.1, 9.2, 9.3, 9.4, 9.5, 9.6 and 9.7 indicate the faces of the rotating drum 9. As it will be better explained below with particular reference to the sequence of FIGS. 2A-2F, not all the faces 9.1-9.7 have the same dimension in the direction orthogonal to the axis 9A of rotation, to allow scanning of different portions of the overall field of view. The number and, thus, the extension of faces 9.1-9.7 may change; that indicated in the figures only represents an exemplary and illustrative embodiment of the concept underlying the invention.

The outer surfaces of faces 9.1 to 9.6 are treated so as to be reflective. Therefore, they form plane mirrors for reflecting the image from the outer scene. Also the face 9.7 may be reflective. In other embodiments, described below, the face 9.7 is non-reflective and may carry a thermal reference for equalizing the sensor 3, or it may form a window for viewing a thermal reference inside the drum 9.

The forward motion compensation drum 15 of the forward motion compensation module 13 has a substantially regular prismatic shape with a number of faces equal to that of the scanning drum 9. In the figure, the faces of the rotating drum 15 are sequentially numbered from 15.1 to 15.7. As it will be clearly apparent with reference to FIGS. 2A-2F, each face 9.n (n from 1 to 7) cooperates with a corresponding face 15.j (j varying from 1 to 7), to deviate the radiation beam from the observed scene towards the focusing lens 5 on the sensor 3. In this way, for example, the beams coming from the outer scene and achieving the face 9.1 of the rotating drum 9 are reflected on the face 15.1 of the rotating drum 15, and so on.

This arrangement allows acquiring, in subsequent time intervals, six portions of a field of view, whose overall angle is greater than that of the focusing lens 5 of the sensor 3. Thanks to the combination of the first rotating drum, or scanning drum 9, with the forward motion compensation drum 15, during the image acquisition or integration time of the sensor 3, the image focused by the lens 5 on the image plane of the sensor 3 does not change, as the forward motion of the image due to the rotation of the scanning drum 9 during the acquisition time is balanced by the concord rotation of the drum 15 of the forward motion compensation module 13.

To better understand this concept, reference shall be made to the sequences of FIGS. 2A-2F. Each figure of this sequence shows the two rotating drums 9 and 15 of the scanning module 8 in a view parallel to the axes of rotation. Each face of the scanning drum 9 and the corresponding face of the rotating drum 15 reflect, towards the focusing lens 5 and towards the sensor 3, an image of a portion of the field of view that shall be acquired by the sensor or detector 3 in an integration time. In each figure, each rotating drum 9 and 15 is shown in two distinct angular position, that correspond to the initial and final instant of the image acquisition interval by means of the sensor 3 for one of the six faces 9.1-9.6. In each figure, 9X and 9Y indicate respectively the two angular positions of the rotating drum or scanning drum 9, corresponding to the initial and final instants of the image acquisition interval. 15X and 15Y indicate the two corresponding positions of the rotating drum 15.

With initial reference to FIG. 2A, the face 9.1 is that involved in scanning in this step. In FIG. 2A, 9.1(X) and 9.1(Y) respectively indicate the two subsequent positions of the face 9.1 when the image acquisition, or integration, interval starts and ends (i.e. the rotating drum 9 moves from the position 9.1(X) to the position 9.1(Y) during the image integration time). 15.1(X) and 15.1(Y) analogously indicate the two positions of the face 15.1 at the initial and final instants of the image acquisition interval. The radiation from the outer scene achieves the face 9.1 and is reflected by it towards the face 15.1; it is then bent by the bending mirror 21 towards the lens 5 focusing the image on the sensor 3.

As shown in the diagram of FIG. 2A, the image framed by the detector, when the scanning interval corresponding to the face 9.1 and to the face 15.1 starts, is formed by the beam FX(1). α1 indicates the beam width, i.e. the width of the portion of the field of view acquired in this step. As the two drums 9 and 15 rotate in the same direction, during the acquisition interval the beam moves from the position FX(1) to the position FY(2). As shown in the diagram of FIG. 2A, the two beams FX(1) and FY(2), even if displaced relative to each other, remain however parallel. This is due to the compensation, through the forward motion compensation module 13, of the change in the angular position of the reflecting face 9.1 of the scanning drum 9 during the integration time, i.e. during the image acquisition interval by the sensor or detector 3. As the observed image is substantially at infinity focus, the translation of the beam FX(1)-FY(2) parallel to itself does not affect the acquired image, i.e. no parallax error occurs.

Integration interval, i.e. the time necessary to acquire the image reflected by the reflecting face 9.1 relative to the angular speed of rotation of the drums 9 and 15, is sufficiently short; therefore, during this time interval the two reflecting faces 9.1 and 15.1 face each other in such angular positions to project correctly the image acquired by the sensor or detector 3.

Once the image reflected by the reflecting face 9.1. and by the reflecting face 15.1 has been acquired, the sensor 3 stops the image acquisition and both the rotating drums 9 and 15 continue to rotate at constant speed until they achieve the position of FIG. 2B. In this position or, more exactly, in the time interval during which the rotating drums 9 and 15 move from one to the other of the two potions of FIG. 2B, the sensor 3 acquires the image i.e. the subsequent portion of the field of view. The image of the outer scene is reflected by the second reflecting face 9.2 of the rotating drum 9 towards the second reflecting face 15.2 of the forward motion compensation drum 15 and from here towards the focusing lens 5 through the bending mirror 21.

In FIG. 2B equal or equivalent numbers indicate parts equal or equivalent to those of FIG. 2A. More in particular, 9.2(X) and 9.2(Y) indicate the two positions taken by the reflecting face 9.2 at the beginning and at the end of the integration interval, i.e. the image acquisition interval. Analogously, 15.2(X) and 15.2(Y) indicate the two positions taken by the second reflecting face 15.2 of the drum 15 of the forward motion compensation module 13.

As it is clearly apparent by comparing FIGS. 2A and 2B, the second image acquired by the sensor 3 during this acquisition interval corresponds to a different portion of the overall field of view of the scanning module. FX(2) and FY(2) indicate two beams entering at the beginning and at the end of the image acquisition interval. The two beams FX(2) and FY(2) are parallel, like the two beams FX(1) and FY(1), but are angularly displaced relative to these latter.

Using the same sequence of symbols and reference numbers, FIGS. 2C, 2D, 2E, and 2F show the acquisition steps of the remaining portions of the overall field of view through the pairs of reflecting faces 9.3, 15.3; 9.4, 15.4; 9.5, 15.5; 9.6, 15.6, respectively.

All FIGS. 2A-2F always show the two angular positions of the drums 9 and 15 at the beginning and at the end of the integration interval or image acquisition interval. As it is shown in all figures, the beam FX(n) and the beam FY(n), where n=1, 2, 3, 4, 5, 6, is parallel to itself during all the image acquisition interval due to the effect of the image angular motion compensation obtained through the forward motion compensation module 13.

The overall field of view obtained by combining the sensor or detector 3, the lens 5 and the scanning module 8 is given by the sum of the portions of field of view represented by the beams FX(n) and FY(n), where n=1-6. Each portion of the field of view may have an area overlapping the adjacent portion.

Figure 3:
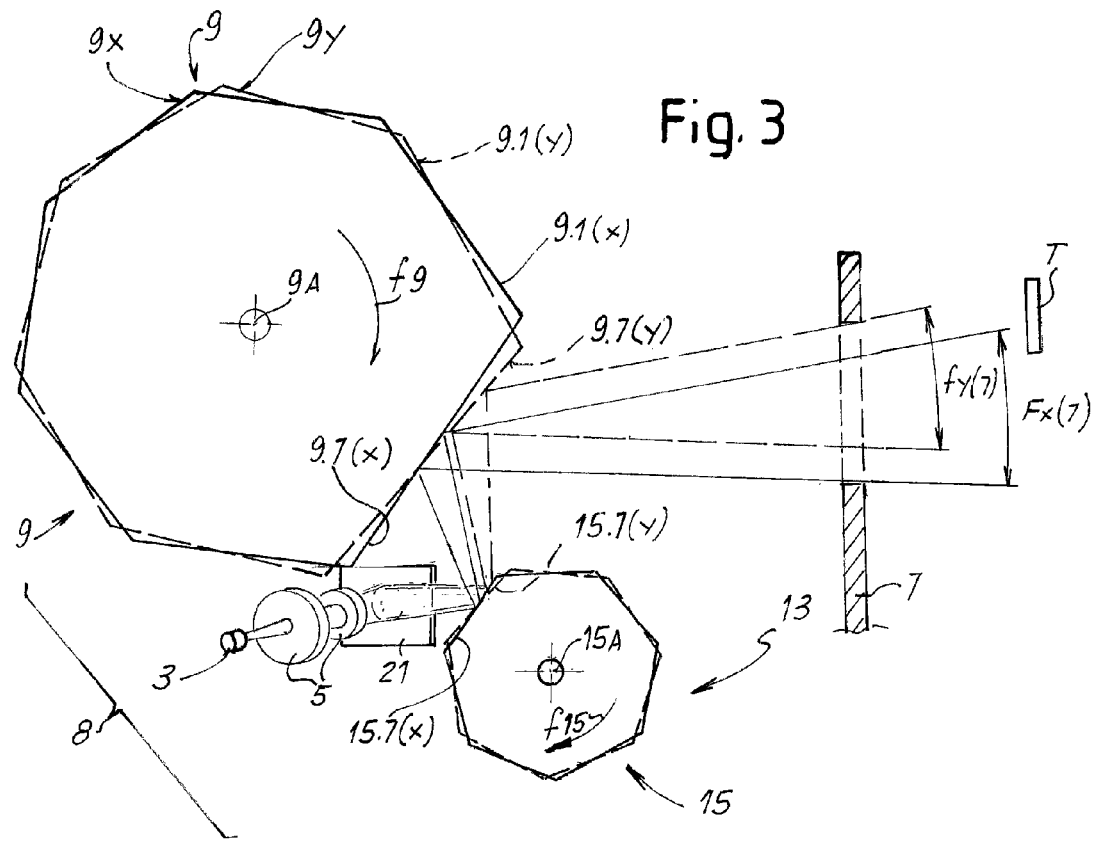
FIGS. 3, 4, and 5 schematically show the sequence for acquiring a sensor equalization image, in three different embodiments.

If the sensor is an infrared sensor, the seventh face 9.7 of the rotating drum 9 projects the thermal reference image towards the detector or sensor 3 for equalizing this latter. This step of acquiring the thermal reference image is schematically shown in FIG. 3. Acquisition occurs according to the same principle, as rotations of the drums 9 and 15 in the same direction and at the same speed allow compensating the image forward motion. The thermal reference is indicated in FIG. 3 with T and shown on the same scanning plane as the image of the outer scene. It should however be understood that the reflecting face 9.7 is slightly inclined relative to the axis 9A of rotation of the rotating drum 9 (see FIG. 1) so as to acquire an image of a thermal reference T that is outside the acquisition windows of the images of the outer scene.

As can be understood by observing the sequence of FIGS. 2A-2F and 3, the shape of the drums 9 and 15 allows acquiring images from a wide field of view by subdividing it into individual view portions, through a continuous rotational motion, eliminating the forward motion effect by combining the concord and synchronous rotations of the two drums.

In a practical embodiment, the scanning module may have the following features:

| | |
|---|---|
| Overall field of view (H x V) [9° being the width of the field of view in vertical direction, i.e. parallel to the rotation axis of the drums) | 84 degrees x 9 degrees |
| Field of view of the observable scene (H x V) | 72 degrees x 9 degrees |
| Fraction of the field of view of equalization image acquisition | 12 degrees x 9 degrees |
| Fraction of the field of view acquired by each face 9.1-9.6 | 12 degrees x 9 degrees |
| Instant Field Of View | 0.2 mrad |
| Entrance pupil diameter | 40 mm |
| Number of acquisitions at each rotation of the scanning drum | 7 |
| Integration time | 2 ms |
| Acquisition time of the overall field of view (frame time) | 91 ms (11 Hz) |
| Angular speed of the drums 9 and 15 | 69 rad/s |

The sensor equalization image may be acquired different manners and not necessarily through a thermal reference T arranged outside the scanning module, as shown in FIG. 3.

Figure 4:
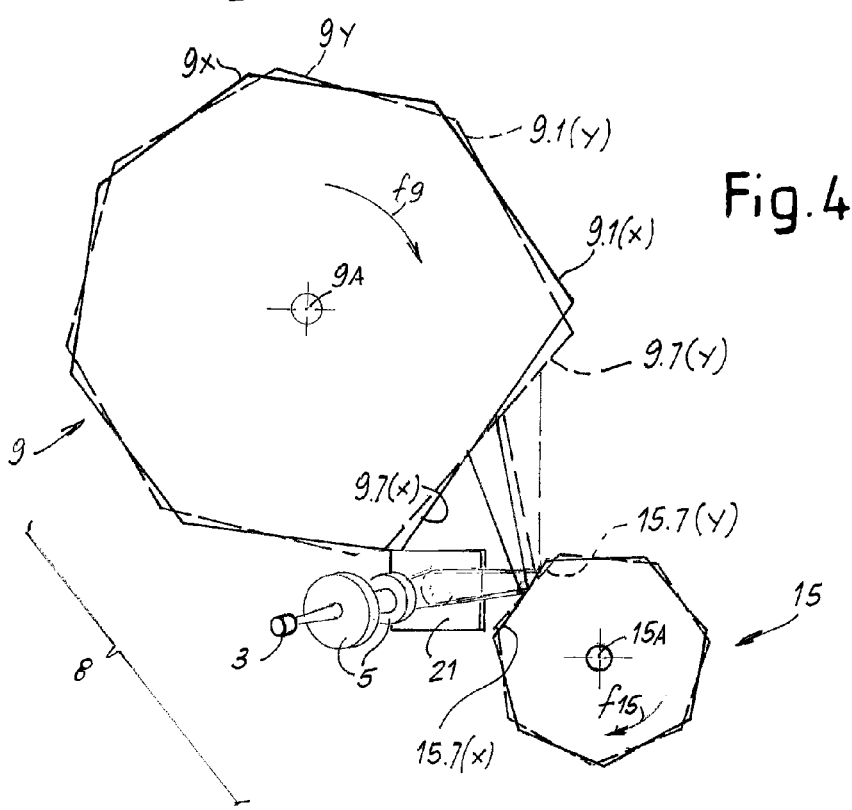

FIG. 4 shows, for instance, a modified embodiment wherein the thermal reference for equalizing the sensor or detector 3 is on the face 9.7 of the rotating drum 9. In this case the face 9.7 is non-reflective, and the sensor 3 acquires the equalization image observing the thermal reference arranged on the face 9.7 and reflected onto the reflecting face 15.7 of the rotating drum 15 and from here to the bending mirror 21 towards the focusing lens 5. The dimension of the thermal reference is sufficient to cover the displacement resulting from the motion of the two drums 9 and 15.

Figure 5:
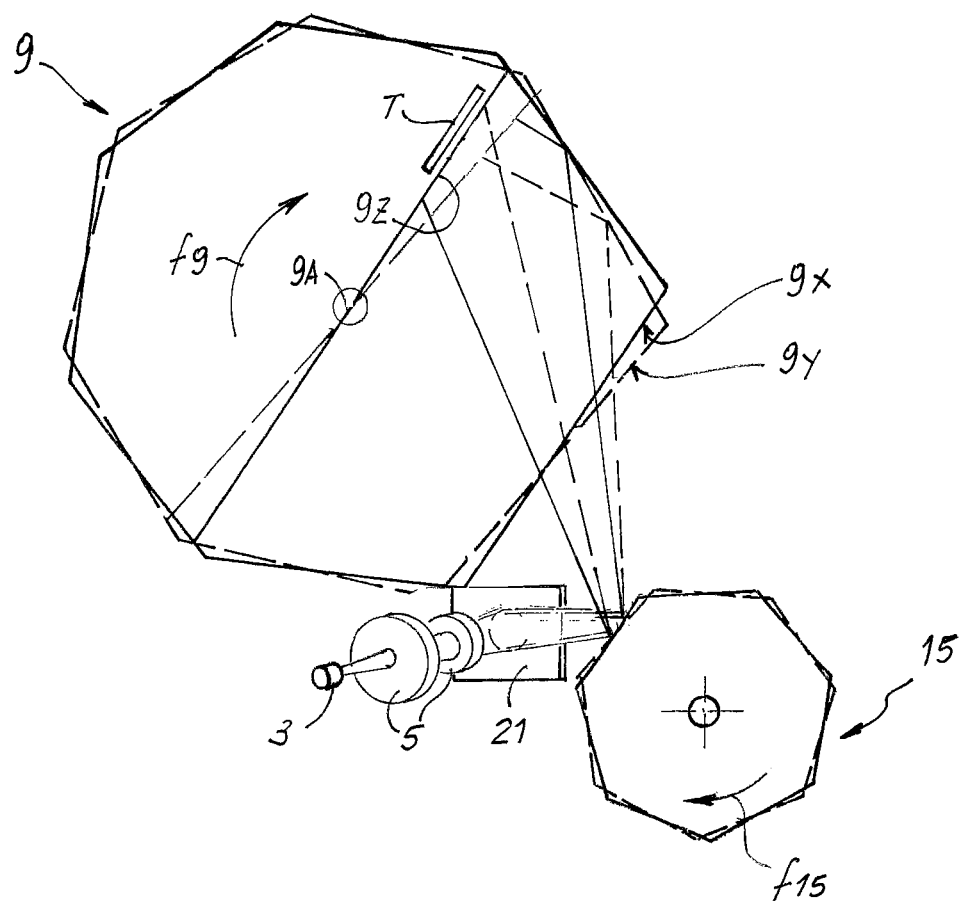

FIG. 5 shows another modified embodiment of the scanning module, wherein the equalization image is acquired from the inside of the rotating drum 9. In this case, a surface 9Z carrying the thermal reference T is arranged inside the rotating drum 9. The beams shown in FIG. 5 and the two positions 9X and 9Y of the rotating drum 9, as well as the positions 15X, 15Y of the rotating drum 15, taken at the beginning and at the end of the equalization image integration interval. In this case again, the dimension of the thermal reference is sufficient to cover the displacement resulting from the motion of the two drums 9 and 15.

In some embodiments, not shown, the thermal reference may be arranged on the face 15.7 of the drum 15 of the forward motion compensation module.

FIGS. 6 and 7 show a modified embodiment of the scanning module. The same numbers indicate equal or equivalent parts to those of the scanning module described above with reference to FIGS. 1-5.

In the embodiment of FIGS. 6 and 7, with the rotating drum 9 a first forward motion compensation module 13 is associated, comprising the rotating drum 15 and reflecting the image towards a bending mirror 21, that in turn bends the image path towards a focusing lens 5 of a receiver 3. In different position around the rotation axis 9A of the rotating drum 9 a second forward motion compensation module 13B is arranged, comprising a further forward motion compensation drum 15B rotating according to the arrow f15B in the same direction and at the same angular speed as the rotating drum 9. With the forward motion compensation module 13B a second bending mirror 21B is associated, bending the acquired image towards a second focusing lens 5B associated with a second detector 3B. The arrangement of the members of the forward motion compensation module 13B is substantially the same as that of the forward motion compensation module 13.

In FIG. 7, showing a side view of the device according to the line VII-VII of FIG. 6, the rotating drums 15 and 15B of the forward motion compensation module 13 and of the forward motion compensation module 13B are offset along the direction of the axis 9A of rotation of the rotating drum 9. It is therefore possible to acquire images from two offset fields of view through the single rotating drum 9 and the two drums 15, 15B of the two forward motion compensation modules 13 and 13B respectively. This offset arrangement of the drums 15, 15B with respect to the axial direction 9A is such that the drums 15, 15B of the forward motion compensation modules 13, 13B do not enter or cover the field of view of the scene.

Based upon the same principle, around the axis 9A of the rotating drum 9 it is possible to arrange more than two forward motion compensation modules with respective rotating drums similar to the drums 15, 15B and corresponding focusing lenses and sensors or detectors, so as to increase the overall field of view. A field of view up to 360° may be covered.

In FIGS. 8 and 9 a further embodiment of a scanning module according to the invention is shown. The same numbers indicate the same or equivalent parts to those of the previous embodiments. In FIGS. 8 and 9 the first rotating drum or scanning drum 9 is aligned axially with the drum 15 of the forward motion compensation module. In FIG. 9, reference A indicates the two coincident rotation axes of the drums 9 and 15. The two drums 15 and 9 rotate according to the arrow f15 and f9 respectively. Differently than in the previously described embodiments, the two drums 9 and 15 rotate at the same angular speed but, in this case, in opposite directions of rotation. The shape of the two drums is substantially equal to what described with reference to the previous embodiments, and the faces are indicated with the same reference numbers. In FIGS. 8 and 9 the two drums 9 and 15 are arranged so as to limit the overall bulk of the scanning module 5 and of the whole scanning system. The maximum frequency is in this case 3-4 Hz.

To convey the image reflected by each face 9.1-9.6 towards the corresponding face 15.1-15.6, two bending mirrors 31, 33 are provided, shown one over the other in the plan view of FIG. 9. FIGS. 8 and 9 schematically show a possible position of the lens 5 and the detector 3. It should be understood that the position of the components 5, 3 may differ from that illustrated, for instance using a further bending mirror as shown in the previous embodiments, wherein the axis of the lens 5 is substantially parallel to the rotation axis of the two drums 9 and 15.

The equalization image may be acquired for instance as already described with reference to the embodiments illustrated in FIGS. 1 to 7.

The embodiment of FIGS. 8 and 9 may be further modified by arranging a second forward motion compensation drum and a second lens with corresponding bending mirrors, analogously to the embodiment of FIGS. 6 and 7.

The embodiments described above and illustrated in the drawings have been explained in detail; however, it is clearly apparent to those skilled in the art that modifications, variants, additions and omissions are possible without departing from the principles, concepts and learning of the present invention as defined in the attached claims. The scope of the invention shall be therefore determined exclusively based upon the widest interpretation of the attached claims, comprising in this scope these modifications, variants, additions and omissions.

The term "to comprise" and its derivatives do not exclude the presence of further elements or steps in addition to those specifically listed in a given claim. The term "a" or "an" before an element, means or feature of a claim does not exclude the presence of a plurality of these elements, means or features. If a claim of a device claims a plurality of "means", some or all these "means" can be actuated by a single component or member. The enunciation of given elements, features or means in distinct depending claims does not exclude the possibility of combining said elements, features or means together. When a method claim lists a sequence of steps, the sequence with which these steps are listed is not binding and can be changed, if the particular sequence is not indicated as binding.

Any reference numerals in the appended claims are provided to facilitate reading of the claims with reference to the description and to the drawing, and do not limit the scope of protection represented by the claims.

The invention claimed is:

1. A continuous scanning module comprising:
   a polygonal scanning drum rotating around a respective rotation axis at substantially constant speed and provided with a plurality of first reflecting side faces, wherein at least one polygonal forward motion compensation drum is associated with said scanning drum, said at least one polygonal forward motion compensation drum rotating around a respective rotation axis parallel to the rotation axis of the polygonal scanning drum, synchronously with the scanning drum at an angular speed substantially equal to that of the polygonal scanning drum and in a same direction, wherein said at least one polygonal forward motion compensation drum is provided with second reflecting side faces, each of said second reflecting sides receiving an image from a corresponding first reflecting face of said polygonal scanning drum and reflecting said image towards a scanning path, wherein the first reflecting side faces of said polygonal scanning drum have different dimensions in a direction orthogonal to the rotation axis of the polygonal scanning drum, to acquire, in subsequent time intervals, images of different portions of a field of view, wherein motion of the at least one polygonal forward motion compensation drum compensates image forward motion due to rotation of the polygonal scanning drum during an image integration time of each portion of the field of view.

2. A scanning module according to claim 1, wherein said polygonal scanning drum and said at least one polygonal forward motion compensation drum have an equal number of side faces.

3. A scanning module according to claim 1, wherein said at least one polygonal forward motion compensation drum has a regular polygonal cross-section.

4. A scanning module according to claim 1, wherein said first reflecting side faces and said second reflecting side faces have flat surfaces.

5. A scanning module according to claim 4, wherein said first reflecting side faces are parallel to the rotation axis of the polygonal scanning drum and said second reflecting side faces are parallel to the rotation axis of the at least one polygonal forward motion compensation drum.

6. A scanning module according to claim 1, wherein one of the first reflecting side faces of the polygonal scanning drum is designed and arranged to acquire an equalization image for an image sensor.

7. A scanning module according to claim 6, wherein said one of the first reflecting side faces of the polygonal scanning drum designed to acquire the equalization image is reflective and inclined with respect to the rotation axis of the polygonal scanning drum, to acquire said image from the outside of the polygonal scanning drum.

8. A scanning module according to claim 6, wherein said one of the first reflecting side faces of the polygonal scanning drum designed to acquire the equalization image supports a reference generating said equalization image.

9. A scanning module according to claim 6, wherein said one of the first reflecting side faces of the polygonal scanning drum designed to acquire the equalization image is transparent, and wherein inside the polygonal scanning drum a reference is arranged, generating said equalization image, which is directly received by a corresponding face of the at least one polygonal forward motion compensation drum through said one of the first reflecting side faces.

10. A scanning module according to claim 1, wherein one of the second reflecting side faces of the at least one polygonal forward motion compensation drum is designed to acquire an equalization image for an image sensor.

11. A scanning module according to claim 6, wherein said equalization image is generated by a thermal reference.

12. A scanning module according to claim 1, further comprising at least one further forward motion compensation drum.

13. A scanning module according to claim 12, wherein said at least one polygonal forward motion compensation drum and said further forward motion compensation drum are arranged with respect to the polygonal scanning drum so as to scan contiguous fields of view.

14. A scanning system comprising:
   a scanning module comprising a polygonal scanning drum rotating around a respective rotation axis at substantially constant speed and provided with a plurality of first reflecting side faces, wherein at least one polygonal forward motion compensation drum is associated with said polygonal scanning drum, said at least one polygonal forward motion compensation drum rotating around a respective rotation axis parallel to the rotation axis of the polygonal scanning drum, synchronously with the polygonal scanning drum at an angular speed substantially equal to that of the polygonal scanning drum and in a same direction, wherein said at least one polygonal forward motion compensation drum is provided with second reflecting side faces, each of said second reflecting side faces receiving an image from a corresponding first reflecting face of said polygonal scanning drum and reflecting said image towards a scanning path, wherein the first reflecting side faces of said polygonal scanning drum have different dimensions in a direction orthogonal to the rotation axis of the polygonal scanning drum, to acquire, in subsequent time intervals, images of different portions of a field of view, wherein motion of the at least one polygonal forward motion compensation drum compensates image forward motion due to rotation of the polygonal scanning drum during an image integration time of each portion of the field of view;

at least one lens; and at least one sensor, said at least one lens conveying the image acquired by the scanning module towards said at least one sensor and focusing the image on an image plane of said at least one sensor, wherein during an image acquisition or integration time by means of the at least one sensor, the image focused by said at least one lens on said at least one sensor does not change, due to a combination of a rotational motion of the polygonal scanning drum and a rotational motion of the at least one polygonal forward motion compensation drum, the image forward motion due to the rotation of the polygonal scanning drum during an acquisition time being compensated by the rotation of the at least one polygonal forward motion compensation drum.

15. A scanning system according to claim 14, wherein one lens and one detector are provided for each forward motion compensation module.

16. A scanning system according to claim 15, wherein said detector is an infrared detector.

17. A method for scanning consecutive portions of a field of view through a continuously rotating scanning drum having irregular polygonal shape, the method comprising:

compensating an image forward motion during an integration time of a sensor by reflecting an image of a portion of the field of view from the continuously rotating scanning drum onto a corresponding reflective surface of a forward motion compensation drum rotating synchronously with the continuously rotating scanning drum, at a same angular speed and in a same direction as the continuously rotating scanning drum, around respective axes of rotation parallel to each other.

18. A method for scanning consecutive portions of a field of view through a continuously rotating scanning drum having irregular polygonal shape, the method comprising:

compensating an image forward motion during an integration time of a sensor by reflecting an image of a portion of the field of view from the continuously rotating scanning drum onto a corresponding reflective surface of a forward motion compensation drum rotating synchronously with the continuously rotating scanning drum, at a same angular speed and in an opposite direction as the continuously rotating scanning drum, said continuously rotating scanning drum and said forward motion compensation drum being arranged one over the other and rotating around a common axis, wherein bending mirrors are provided, arranged for conveying the image, reflected by first reflecting faces of the continuously rotating scanning drum, towards second reflecting faces of the forward motion compensation drum.

19. A continuous scanning module comprising:

a polygonal scanning drum rotating around a respective rotation axis at substantially constant speed and provided with a plurality of first reflecting side faces, wherein at least one polygonal forward motion compensation drum is associated with said polygonal scanning drum, said at least one polygonal forward motion compensation drum rotating around a rotation axis coinciding with the rotation axis of the polygonal scanning drum and synchronously therewith at an angular speed substantially equal to an angular speed of the polygonal scanning drum and in an opposite direction, wherein said at least one forward motion compensation drum is provided with second reflecting side faces, each of said second reflecting side faces receiving an image from a corresponding first reflecting face of said polygonal scanning drum and reflecting the image towards a scanning path, wherein bending mirrors are provided, arranged for conveying the image, reflected by the first reflecting faces of the polygonal scanning drum, towards the second reflecting faces of the at least one polygonal forward motion compensation drum, wherein the first reflecting side faces of said polygonal scanning drum have different dimensions in a direction orthogonal to the rotation axis of the polygonal scanning drum, to acquire, in subsequent time intervals, images of different portions of a field of view, wherein motion of the at least one polygonal forward motion compensation drum compensates an image forward motion due to rotation of the polygonal scanning drum during an image integration time of each portion of the field of view.

20. A scanning module according to claim 19, wherein said polygonal scanning drum and said at least one polygonal forward motion compensation drum have an equal number of side faces.

21. A scanning module according to claim 19, wherein said at least one polygonal forward motion compensation drum has a regular polygonal cross-section.

22. A scanning module according to claim 19, wherein said first reflecting side faces and said second reflecting side faces have flat surfaces.

23. A scanning module according to claim 22, wherein said first reflecting side faces are parallel to the rotation axis of the polygonal scanning drum and said second reflecting side faces are parallel to the rotation axis of the at least one polygonal forward motion compensation drum.

24. A scanning module according to claim 19, wherein one of the first reflecting side faces of the polygonal scanning drum is designed and arranged to acquire an equalization image for an image sensor.

25. A scanning module according to claim 24, wherein said one of the first reflecting side faces of the polygonal scanning drum designed to acquire the equalization image is reflective and inclined with respect to the rotation axis of the polygonal scanning drum, to acquire said image from outside of the polygonal scanning drum.

26. A scanning module according to claim 24, wherein said one of the first reflecting side faces of the polygonal scanning drum designed to acquire the equalization image supports a reference generating said equalization image.

27. A scanning module according to claim 24, wherein said one of the first reflecting side faces of the polygonal scanning drum designed to acquire the equalization image is transparent, and wherein inside the polygonal scanning drum a reference is arranged, generating said equalization image, which is directly received by a corresponding face of the at least one polygonal forward motion compensation drum through said one of the first reflecting side faces of the polygonal scanning drum.

28. A scanning module according to claim 19, wherein said one of the second reflecting side faces of the at least one polygonal forward motion compensation drum is designed to acquire an equalization image for an image sensor.

29. A scanning module according to claim 24, wherein said equalization image is generated by a thermal reference.

30. A scanning module according to claim 19, further comprising at least one further forward motion compensation drum.

31. A scanning module according to claim 30, wherein said at least one polygonal forward motion compensation drum and said further forward motion compensation drum are arranged with respect to the polygonal scanning drum so as to scan contiguous fields of view.

32. A scanning system, comprising:
a continuous scanning module comprising a polygonal scanning drum rotating around a respective rotation axis at substantially constant speed and provided with a plurality of first reflecting side faces, wherein at least one polygonal forward motion compensation drum is associated with said polygonal scanning drum, said at least one polygonal forward motion compensation drum rotating around a rotation axis coinciding with the rotation axis of the polygonal scanning drum and synchronously therewith at an angular speed substantially equal to an angular speed of the polygonal scanning drum and in an opposite direction, wherein said at least one polygonal forward motion compensation drum is provided with second reflecting side faces, each of said second reflecting side faces receiving an image from a corresponding first reflecting face of said polygonal scanning drum and reflecting the image towards a scanning path, wherein bending mirrors are provided, arranged for conveying the image, reflected by the first reflecting faces of the polygonal scanning drum, towards the second reflecting faces of the at least one polygonal forward motion compensation drum, the first reflecting side faces of said polygonal scanning drum having different dimensions in a direction orthogonal to the rotation axis of the polygonal scanning drum, to acquire, in subsequent time intervals, images of different portions of a field of view, wherein motion of the at least one polygonal forward motion compensation drum compensates the image forward motion due to rotation of the polygonal scanning drum during an image integration time of each portion of the field of view;
at least one lens; and
at least one sensor, wherein the at least one lens conveys the image acquired by the scanning module towards said at least one sensor and focuses said image on an image plane of said at least one sensor, wherein during an image acquisition or integration time by means of the at least one sensor, the image focused by said at least one lens on said at least one sensor does not change, due to a combination of rotational motion of the polygonal scanning drum and rotational motion of the at least one polygonal forward motion compensation drum, the image forward motion due to the rotation of the polygonal scanning drum during an acquisition time being compensated by the rotation of the at least one polygonal forward motion compensation drum.

33. A scanning system according to claim 32, wherein one lens and one detector are provided for each forward motion compensation module.

34. A scanning system according to claim 33, wherein said detector is an infrared detector.

* * * * *